United States Patent [19]

Sanborn et al.

[11] Patent Number: 5,637,863

[45] Date of Patent: Jun. 10, 1997

[54] SURGICAL LIGHT WITH TOUCHLESS SWITCH

[75] Inventors: Bruce A. Sanborn; Shawn E. O'Hara, both of Rochester, N.Y.

[73] Assignee: MDT Corporation, Rochester, N.Y.

[21] Appl. No.: 295,997

[22] Filed: Aug. 24, 1994

[51] Int. Cl.⁶ .................................................. G06M 7/00
[52] U.S. Cl. .................. 250/221; 250/227.23; 315/159; 315/362
[58] Field of Search ....................... 315/362, 155, 315/158, 159, 313, 312, 153; 362/804, 13, 33, 227, 233; 250/221, 214 B, 227.23

[56] References Cited

U.S. PATENT DOCUMENTS

| | | | |
|---|---|---|---|
| 3,480,787 | 11/1969 | Johansen | 250/221 |
| 3,576,277 | 4/1971 | Blackmon | 222/1 |
| 3,670,167 | 6/1972 | Forbes | 250/221 |
| 4,025,778 | 5/1977 | Hayakawa | 240/1.4 |
| 4,037,096 | 7/1977 | Brendgord et al. | 240/1.4 |
| 4,288,844 | 9/1981 | Fisher et al. | 362/33 |
| 4,538,214 | 8/1985 | Fisher et al. | 362/147 |
| 4,734,625 | 3/1988 | Geanous et al. | 315/313 |
| 4,767,922 | 8/1988 | Staiffer | 250/221 |
| 4,796,825 | 1/1989 | Hawkins | 242/55.53 |
| 4,873,469 | 10/1989 | Young et al. | 315/155 |
| 4,876,435 | 10/1989 | Hawkins | 219/364 |
| 5,103,085 | 4/1992 | Zimmerman | 250/214 B X |
| 5,156,456 | 10/1992 | Hoftman et al. | 362/400 |
| 5,262,640 | 11/1993 | Purvis et al. | 250/227.25 |
| 5,355,292 | 10/1994 | Hoftman et al. | 362/400 |
| 5,397,890 | 3/1995 | Schueler et al. | 250/221 |

*Primary Examiner*—Robert Pascal
*Assistant Examiner*—Haissa Philogene
*Attorney, Agent, or Firm*—Trask, Britt & Rossa

[57] ABSTRACT

An operatory light fixture having a touchless switch operatively connected to a lamp disclosed. The touchless switch is constructed to detect a user's hand when positioned in a command location relative to the touchless switch and to respond thereto by operating the lamp. In a preferred embodiment, the touchless switch is an active infrared-type switch, comprising means for emitting infrared light toward a command location, means for detecting infrared light reflected from an object such as a hand which is positioned at or near the command location, and relay means responsively connected to the detection means and operatively connected to the lamp. In another preferred embodiment, the touchless switch includes means for discriminating a true signal produced by placement of an object such as a user's hand at the command location, from randomly occurring fluctuations in light intensity in the operatory environment.

20 Claims, 3 Drawing Sheets

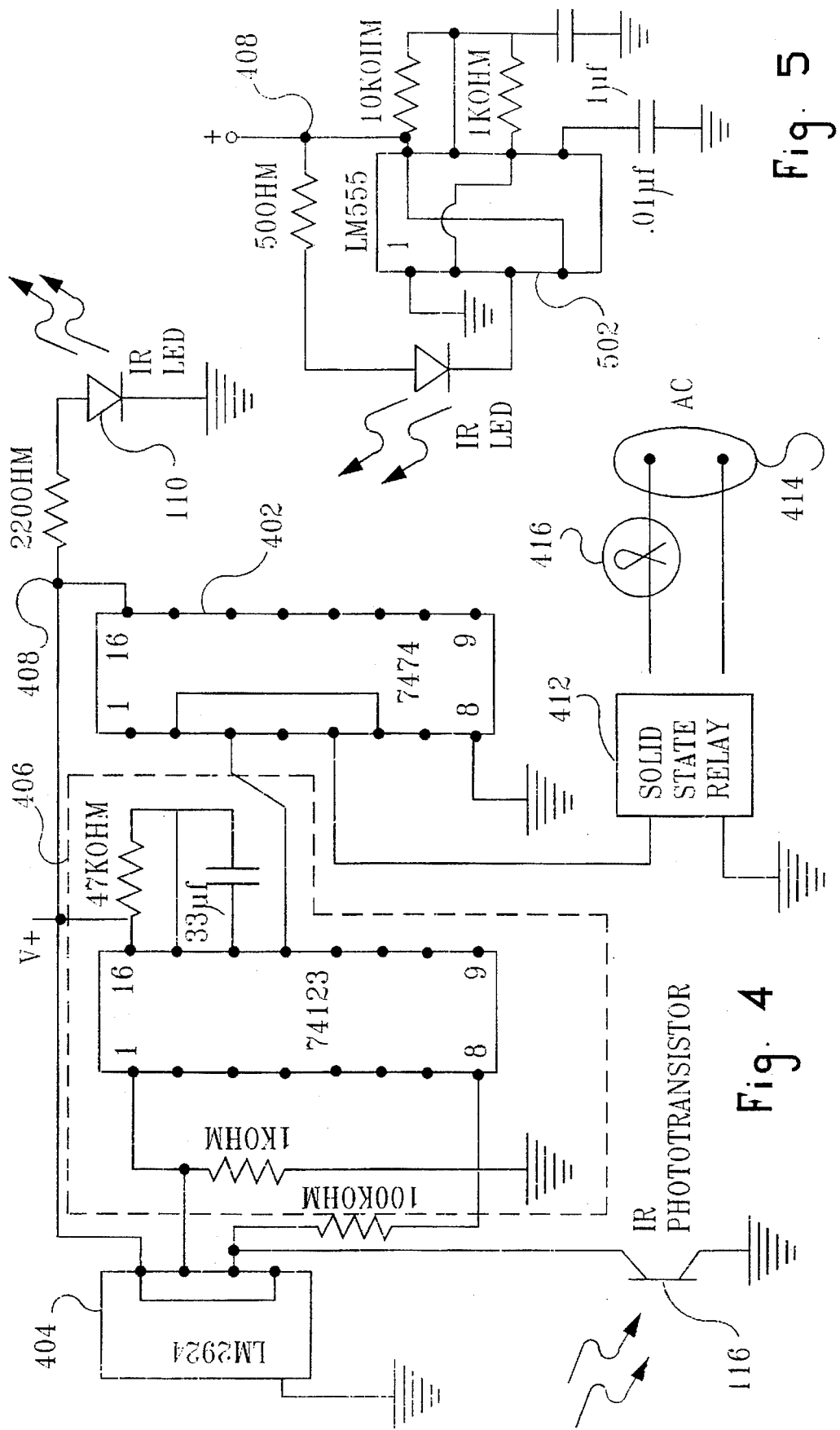

SURGICAL LIGHT WITH TOUCHLESS SWITCH

BACKGROUND OF THE INVENTION

1. Field of the Invention

This invention relates to activation means for lights used in surgical, medical and dental procedures requiring maintenance of sterility.

2. State of the Art

The need for a dental or medical practitioner to maintain sterile hands during surgery and other therapeutic procedures is well known, as is the need for good lighting of the therapeutic field. It is known to provide surgical light fixtures with sterilizable handles and/or handle covers to permit a light to be focussed or adjusted by the practitioner to illuminate a desired area without contaminating the practitioner's hands. Such a sterilizable handle or handle cover must be replaced between each procedure or patient. Also, the handle or handle cover must be sterilized, or purchased in a sterile condition, adding to the cost of purchase/use of the device.

Several kinds of touchless switches or relays are known, and have been employed for various uses. For example, a passive infrared-responsive switch which detects infrared radiation from a person can be used to turn on a light as the person enters a room, as described in U.S. Pat. No. 4,873,469. So-called "active" infrared switches, which emit an infrared beam at a location and have a detector placed to detect infrared light reflected from that location, have been used to activate hand dryers, towel holders, and water faucets (see for example U.S. Pat. Nos. 4,876,435, 4,796,825, 4,767,922, 3,480,787, 3,670,167, and 3,576,277). In a medical or dental environment, touchless switches would allow a practitioner to operate a light without jeopardizing manual sterility, and without requiring replacement and/or sterilization of the switch between patients.

Accordingly, a need remains for an operatory light for dental or surgical use which has a touchless switch mechanism. Desirably, such a touchless switch will be able to accurately discriminate "true" signals from false in the ambient light environment of the operatory room.

SUMMARY OF THE INVENTION

The invention comprises a lamp or light fixture for use in a sterile environment, for example in a dental or medical surgical setting. The fixture has at least one lamp or light bulb disposed in a housing, and touchless switch means operatively connected to toggle the lamp. The touchless switch means is constructed to selectively respond to a user's signal without requiring physical contact with, or pressure exerted by, the user. In a highly preferred embodiment, the touchless switch is selectively responsive to the placement of a user's hand in a command location, and non-responsive to movements or changes in the environment outside the command location.

A working embodiment has an active reflectance switch comprising means for emitting a light beam toward a command location, means for detecting light reflected from an object such as a hand which is positioned at or near the command location, and relay means responsively connected to the detection means and operatively connected to toggle the lamp from a lit state to an unlit state. In a further embodiment, the switch may be constructed with dimming means allowing the lamp to be toggled incrementally between a brightly-lit state and an unlit state.

Desirably, the touchless switch is provided with means for discriminating a true signal produced by placement of an object, such as a user's hand at the command location, from randomly occurring fluctuations in light intensity in the operatory environment and under different ambient light conditions. Such discrimination means may include electrical circuit filtering to eliminate false or random signals, and/or optical filters placed to limit the wavelength range of light reaching a light detector associated with the switch. In the case of a switch of the type which detects reflected light from the user's hand, the switch may be provided with means for adjusting the detection sensitivity to differing ambient light conditions.

BRIEF DESCRIPTION OF THE DRAWINGS

In the drawings, which illustrate what is presently regarded as the best mode of carrying out the invention.

FIG. 4 is a diagram of electrical circuits for an alternate embodiment of the touchless switch;

FIG. 5 is a circuit diagram of an optional modification to the circuit of FIG. 4.

DETAILED DESCRIPTION OF THE ILLUSTRATED EMBODIMENTS

Figure 1:
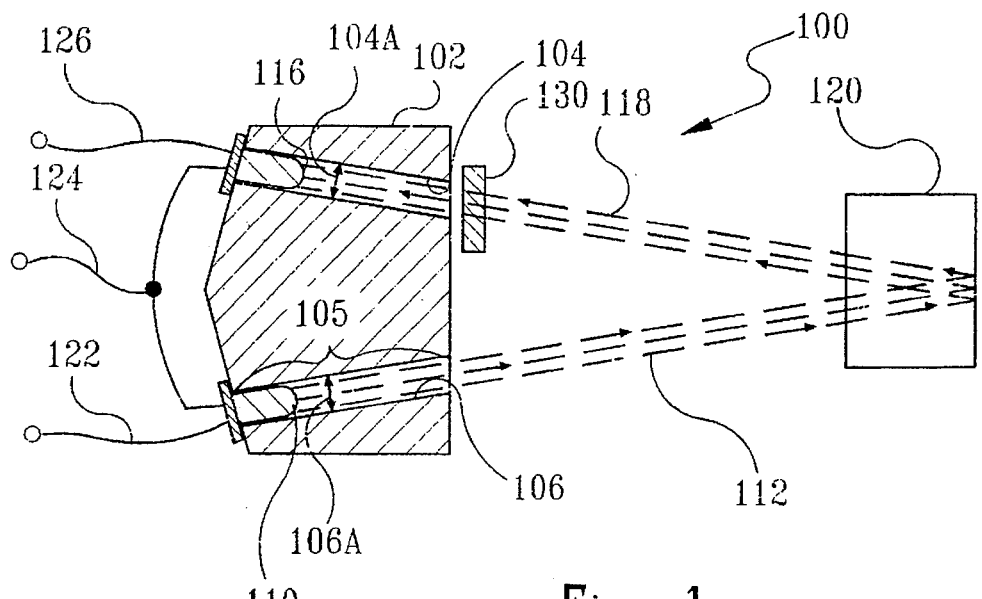
FIG. 1 is a side cross-section view of an infrared sensor which forms part of the touchless switch of the invention.

Referring to FIG. 1, an active reflectance sensor unit indicated generally at 100 comprises a housing block 102 having two channels 104, 106 passing through it. A light source 110, here embodied as a light-emitting diode (LED), is positioned towards the rear of channel 106 to emit an outgoing light beam 112 through the channel. A light detector 116, capable of detecting light emitted by source 110, is disposed in channel 104. Channels 104, 106 are arranged, and LED light source 110 and light detector 116 are oriented, such that the optical axes of the IR source 110 and detector 116 parallel one another or slightly converge. Beam 118 comprises that portion of beam 112 being reflected from an object in the region 120. In a present working embodiment, region 120 extends from about 2 to about five inches from the housing block 102. Conductive wires 122, 124, 126 extend as indicated to provide power to the light source 110 and to conduct signals from the detector 116 to the lamp.

In principle, sensor 100 may be any active reflectance sensor. However, infrared-light-based reflectance sensors are presently preferred to avoid excess interference from environmental sources of visible light. Further preferably, the light source 110 provides a radiant intensity of 50 milliwatts/cm$^2$ or greater at a current of 50 mA. Also, there should be a good match between the spectral detection sensitivity of detector 116 and the peak output wavelength of the light source 110. A presently preferred infrared reflectance sensor is the Stanley DN-305 (Stanley Electric Co., Battle Creek, Mich.), which has a radiant intensity of 80 milliwatts/cm$^2$ at a peak wavelength of about 850 nanometers. Another example of such a sensor which can be used, but which has a much lower radiant intensity and for this and other reasons is less preferred, is the ARCHER GP1U52X, made by the Tandy Corp. and available from RADIO SHACK under catalog #276-137.

Block 102 is preferably constructed of a material which is easily machined or molded, and which is dark or black in color or otherwise opaque to infrared light, or can be coated to provide such properties. At least the interior surfaces of the channels 104, 106 should be thus coated. In the emitter channel 106, the dark coloring absorbs stray light so that light emitted from the channel is in effect a partially collimated beam aimed at region 120, thus reducing the potential for reflection from other surrounding objects. In the detector channel 104, the dark coloring helps ensure that only light directly reflected from the hand or object impinges on the detector. A presently preferred material is aluminum painted black on at least the inner surfaces of the channels. Alternatively, the block could be molded or machined of opaque dark plastic, which may reduce the cost of manufacturing.

Figure 3:
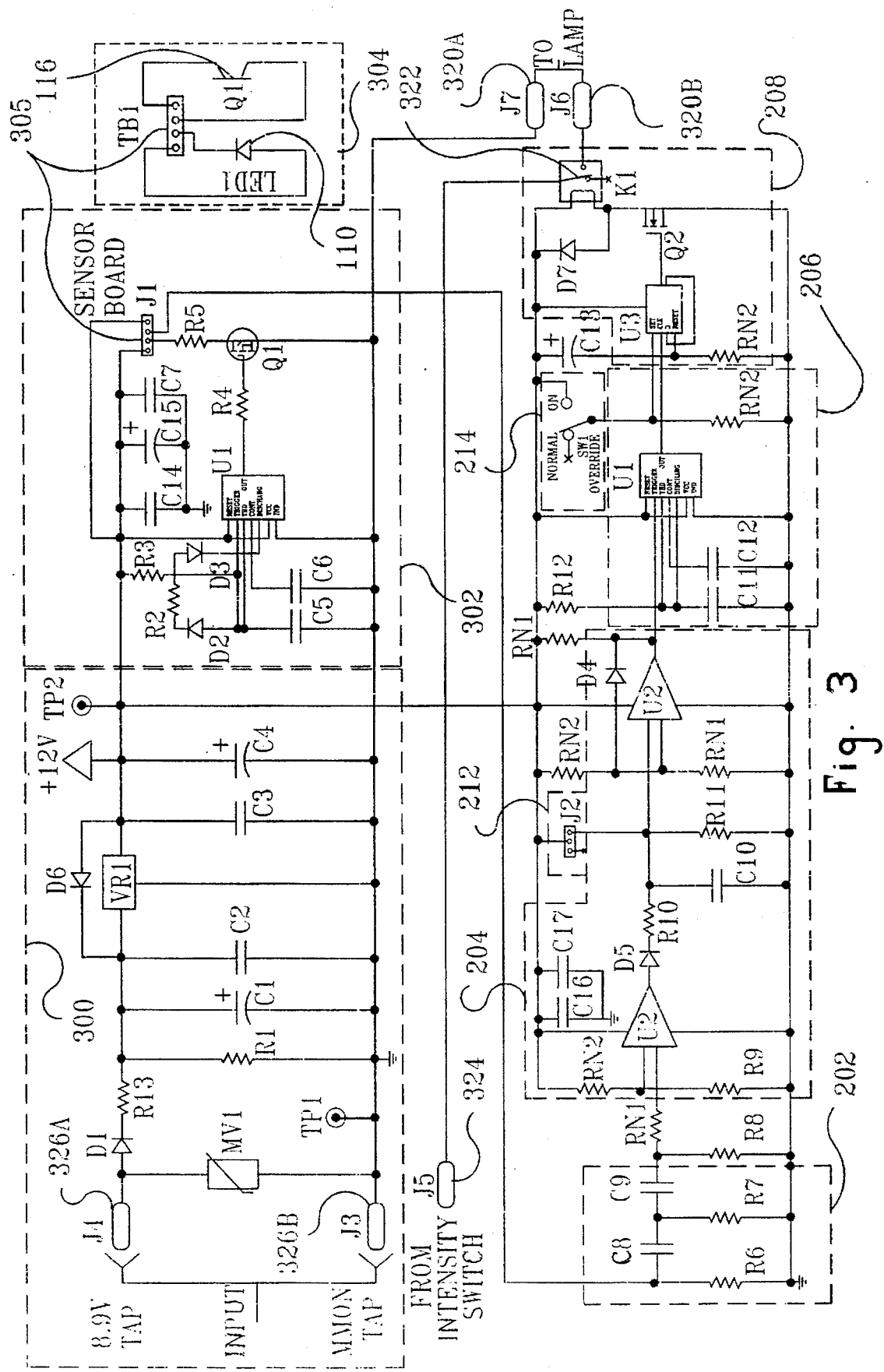
FIG. 3 is a diagram of presently preferred electrical circuits of the touchless switch.

The channels 104, 106 have diameters 104A, 106A which are determined generally by the diameters of the phototransistor and the LED pulse source, respectively. The depth 105 of the channels should be sufficient to avoid scattering of the outgoing transmitter light directly into the detector, but not so large that insufficient light leaves the transmitter channel to produce a detectable amount of reflected light. For given channel diameters, the optimal depth 105 can be determined experimentally. A depth of about twice the channel diameter has been found to work well. For the embodiment whose circuits are shown in FIG. 3, diameters of about 0.21" for the transmitter channel and 0.14" for the detector channel with a channel depth of about 0.18" have been found to yield good results.

Further, the spacing and angling of the channels 104, 106 are selected to in effect "focus" a sufficient amount of transmitted light to a desired command location to achieve a detectable reflection pulse, and to provide for adequate detection of the light reflected from the command location.

In a preferred embodiment, a filter 130 is positioned over the opening of channel 104 in the path of the reflected beam 118, to block electromagnetic radiation outside the wavelength range of the infrared light emitted by source 110. The filter 130 serves to reduce the incidence of false triggers from ambient, low-level or non-infrared light sources, and also prevents desensitization of the detector 116. A filter which blocks wavelengths shorter than about 700 nanometers (nm) is suitable; for example, the #89B filter from Eastman Kodak, Rochester, N.Y.

Figure 2:
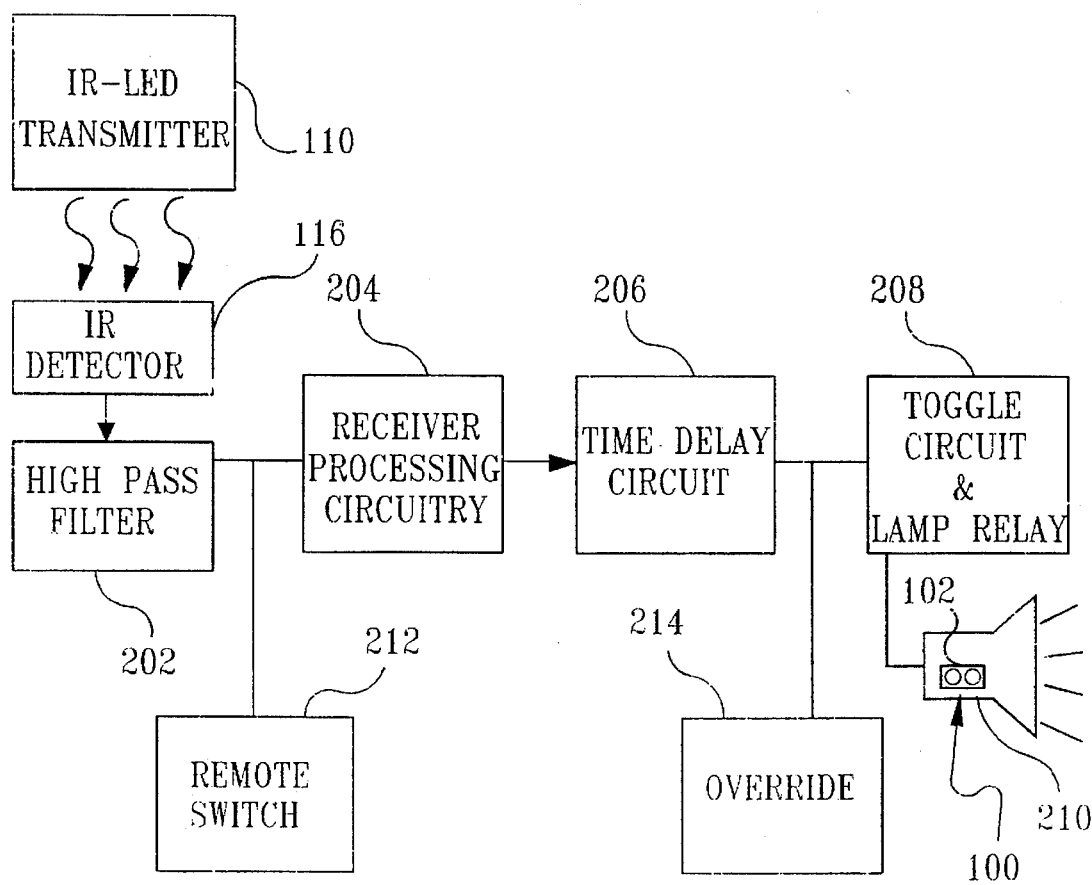
FIG. 2 is a block diagram of subcircuits of a preferred embodiment of a touchless switch circuit for a surgical lamp.

Turning to FIG. 2, it is seen that the signal output of detector 116 is sent through a high-pass filter 202. The output signals which pass through the high-pass filter are then sent to receiver processing circuitry 204, which may include a DC rectifier and comparator, and thence to a time delay circuit 206.

Preferably, the receiver processing circuitry 204 is constructed such that several consecutive reflected IR pulses are required to trigger the next stage of the circuit, to avoid activation of the switch by flashes of light or extraneous reflections. A time delay circuit 206 is desirably included to provide that redundant toggling or "strobing" of the lamp does not occur when a user passes her or his hand through the command location with separated fingers, which may result in a series of closely spaced reflectance signals. The time delay circuit 206 is preferably constructed such that once a triggering object is sensed, the hand or object must be removed from region 120 before circuit 206 will reset. Upon removal of the hand, a time delay is started which has a preset duration preferably from about 0.5 seconds to about 1.5 seconds. Time delay durations in this range have been found to reduce strobing effects and false signals resulting from spreading of the fingers as the hand passes through the command location.

Signals which activate the time delay gate then are transmitted to the toggle and lamp relay circuit 208, which is operably connected to the lamp 210. A remote switch 212 and an override 214 are also optionally included and connected to the detector-responsive circuitry. Remote switch 212 is a conventional touch-operated switch, which may desirably be located for operation by the user's foot. Override 214 allows the user to override toggling by the IR switch; under this condition a main power switch (not shown) is used instead.

The embodiment illustrated by FIG. 3 includes the circuits of blocks 202, 204, 206, 208, 212, and 214 from FIG. 2. Additionally, block 300 encompasses a power supply circuit which powers the lamp and the other circuit components; block 302 encompasses a transmitter driver circuit which drives the LED of the sensor; and block 304 encompasses a reflectance sensor including the transmitter LED 110 and the detector photodiode 116. A plugboard connector 305, common to the transmitter driver circuit in block 302 and the reflectance sensor circuit in block 304, represents the connections between the transmitter-detector elements and the remainder of the circuitry.

Outputs 320A, 320B connect the lamp relay 322 of the toggle circuit 208 to the lamp (not shown). Input 324 connects an intensity switch (not shown) to the lamp relay 322. Inputs 326A, 326B are connected to a suitable power source. In the working embodiment, the power source is a wall outlet to which the inputs 326A, 326B are connected via an isolation transformer (not shown) that converts a normal wall outlet voltage to about 18 volts AC, which in turn is sent to the power supply circuitry 300. Power supply circuitry 300 converts the input power to the correct voltages and currents for operation of the switch circuits. TP1 and TP2 are optional test points for testing the circuit for correct operation.

The transmitter driver circuitry 302 is configured and connected to drive the LED light source according to a selected preset pulse protocol. Desirably, the infrared LED source 110 is pulsed at a high current and high frequency with a low duty cycle to produce strong IR pulses. Strong pulses are needed because the human hand (bare, or in surgical gloves), which is a preferred object to place in region 120 to operate the switch, is generally poorly reflective. In the presently preferred embodiment of FIG. 3, a useful pulse protocol is a 350 milliampere (mA) current pulse with a frequency of 2.3 kilohertz (kHz) and a 6% duty cycle.

Desirably, detector 116 is a phototransistor which in concert with receiver processing circuitry 204 converts detected pulses to a direct current whose magnitude increases with increasing numbers of consecutive pulses. The Stanley DN-305 described with reference to FIG. 1 provides this type of operation.

Table I lists the electrical components used in a working embodiment of the circuits of FIG. 3, along with component values (e.g. resistances, capacitances), suppliers and part numbers. The components, connections and operation of the circuits of FIGS. 2, 3 and 4, and simple alternatives to the given values and circuit structures, will be apparent to one of ordinary skill in the art.

TABLE I

| REF. DES | DESCRIPTION | MFR/PART NUMBER |
|---|---|---|
|  | BARE PC BOARD | /310503 |
| C1,C4 | CAP., RADIAL, 470µF/35V | PANASONIC/ECE-A1VGE471 |
| C2,10,11,17 | CAP., .2" SP., 1µF/50V | KEMET/C330C105M5R5C |
| C3,7,14,16 | CAP., .1" SP., .1µF/50V | KEMET/C320C104M5R5C |
| C5,6,8,9,12 | CAP., .1" SP., .01µF/50V | PHILLIPS/C315C103M5R5C |
| C13 | CAP., RADIAL, 10µF/16V | PANASONIC/ECE-A1CGE100 |
| C15 | CAP., RADIAL, 100µF/25V | PANASONIC/ECE-A1EF101 |
| D1,6,7 | DIODE, 1A | MOTOROLA/1N4004 |
| D2,3,4,5 | DIODE, SIGNAL | MOTOROLA/1N914 |
| J1 | 4 POS SCREW TERMINAL BLOCK | AUGAT/2ER-04 |
|  | ALTERNATIVE | AUGAT/SLER-04 |
| J2 | 3 POS CONNECTOR | MOLEX/70543-0002 |
| J3,4,5,6,7 | TAB, .250 R/A, .032 THICK | KEYSTONE/1266 |
| L1 | CHOKE, 1mH, IRON CORE | MILLER/70F103A1 |
| K1 | RELAY, SPDT 12V COIL, 10A | AROMAT/JS1AE-12V |
|  | ALTERNATIVE | AROMAT/JS1E-12V |
|  | ALTERNATIVE | OMRON/GSL-1114P-PS-DC12 |
|  | ALTERNATIVE | OMRON/GSL-114P-PS-DC12 |
| MV1 | VARISTOR, MOV, 47V | PANASONIC/ERZ-CO7DK470 |
|  | ALTERNATIVE | GEN. ELT./V47ZA7 |
| Q1 | MOSFET, N-CHAN, .64A, 1.2 OHM | SILICONIX/VN0300L |
|  | ALTERNATIVE | ZETEX/ZVN4206A |
| Q2 | MOSFET, N-CHAN, .28A, 5 OHM | SILICONIX/VN0610L |
|  | ALTERNATIVE | ZETEX/VN10LP |
| R1,7 | RES., 5% 1/4W 10K C.F. | OHMITE/OK1035 |
| R2 | RES., 1% 1/4W 51.1K M.F. | DALE/RN55D-5112F |
| R3 | RES., 1% 1/4W 3.57K M.F. | DALE/RN55D-3571F |
| R4 | RES., 5% 1/4W 10 OHMS C.F. | OHMITE/OK1005 |
| R5 | RES., 5% 1/2W 22 OHMS C.F. | OHMITE/OL2205 |
| R6 | RES., 5% 1/4W 47K C.F. | OHMITE/OK4735 |
| R8 | RES., 5% 1/4W 15K C.F. | OHMITE/OK1535 |
| R9 | RES., 5% 1/4W 1K C.F. | OHMITE/OK1025 |
| R10 | RES., 5% 1/4W 100 OHMS C.F. | OHMITE/OK1015 |
| R11 | RES., 5% 1/4W 100K C.F. | OHMITE/OK1035 |
| R12 | RES., 5% 1/4W 1M C.F. | OHMITE/OK1055 |
| R13 | RES., 5% 1/4W 22 OHMS C.F. | OHMITE/OK2205 |
| RN1 | RES. NET., 10K, 4 RES., SIP | BOURNS/4608X-102-103 |
| RN2 | RES. NET., 47K, 4 RES., SIP | BOURNS/4608X-102-473 |
| S1 | SPDT SWITCH | ALCO/TSS11DG-RA |
| TP1,2 | TEST POINT | BERGCON/69190-401 |
| U1 | I.C., TIMER, CMOS LOW POWER | TEXAS INSTR./TLC556CN |
| U2 | I.C., OP. AMP | NATIONAL/LM2924N |

TABLE I-continued

| REF. DES | DESCRIPTION | MFR/PART NUMBER |
|---|---|---|
| U3 | I.C., DUAL FLIP FLOP W/ COMPARATOR | NATIONAL/CD4013BCN |
| VR1 | REGULATOR, 12V, TO-220 | NATIONAL/LM340T-12 |

INSTALL HARDWARE AFTER BOARD TEST

An alternate and simpler embodiment is shown in FIG. 4. The IR-emitting LED 110 receives power from V+ through a current-limiting resistor. Signals from the IR detector (phototransistor) 116 are sent to a rectifier/comparator chip 404 and thence to a time delay circuit 406. The signal from the time delay circuit 406 then goes to the integrated circuit 402 which also functions as a toggle circuit, and from there to a lamp relay 412. Lamp relay 412 is connected to control the flow of power from an AC power source 414 to lamp 416.

Optionally, the driver circuit of FIG. 5 may be substituted for the segment extending from junction 408 to the IR LED 110 in FIG. 4. The driver circuit of FIG. 5 includes a timer chip 502 such as an LM555, and provides a 10% duty cycle with 100 mA pulses at a frequency of 1 kHz.

The touchless switch is desirably mounted on the lamp or light fixture in a location which is conveniently reached by the practitioner during an operatory procedure. However, it could be mounted elsewhere and the outputs to the lamp (e.g. outputs 320A, 320B in FIG. 3) could be electrically connected by a cable of length as desired to the lamp itself. Also, while the circuits of FIGS. 3-4 enable the lamp to be toggled from a first state (lit) to a second state (unlit), other circuits could be designed to offer a dimming-type operation in which the lamp is toggled between the two states in a stepwise manner. For example, each detected pass of a hand (or other signal object) over the switching region could change the light output from a higher to a lower level, or vice-versa, instead of from lit to unlit. If necessary, logic circuits and other microprocessors could be included so that different types of hand signals could be registered and interpreted to provide a desired output signal to the lamp. Two passes of a hand within a particular time window might signal on/off, while one pass within the time window adjusts the light level one notch. These and other modifications would be readily implemented by one of ordinary skill.

The foregoing invention is described in detail so as to enable one of ordinary skill to readily make and use the invention. However, it will be apparent to such a person that various modifications of the structures, circuits and component values can be made without departing from the subject matter embraced by this disclosure.

What is claimed is:

1. An operatory light fixture for use in a sterile environment, having at least one lamp disposed in a housing, and a touchless switch operatively connected to said lamp and constructed to include detection means to detect an object placed in a command location, within said sterile environment, relative to said touchless switch and to respond thereto by operating said lamp and further including means for discriminating a true signal produced by placement of said object at said command location from stray light impinging on said detection means.

2. An operatory light fixture for use in a sterile environment, having at least one lamp disposed in a housing, and a touchless switch operatively connected to said lamp and constructed to detect an object placed in a command location, within said sterile environment, relative to said touchless switch and to respond thereto by operating said lamp, said touchless switch being an active reflectance-sensitive switch, comprising means for emitting light, means for detecting light reflected from said object, and relay means responsively connected to said detection means and operatively connected to said lamp.

3. The operatory light of claim 2, wherein said light-emitting means emits infrared light.

4. The operatory light of claim 2, wherein said means for emitting light is constructed to focus said emitted light to said command location, and said means for detecting light is constructed and positioned to receive a substantial portion of reflected light which is reflected from said object in said command region.

5. The operatory light of claim 4, which further includes means for discriminating a true signal produced by said object at the command location from stray light and fluctuations in stray light intensity impinging on the detection means from the surrounding environment.

6. An operatory light fixture for use in a sterile environment, having:
   at least one lamp disposed in a housing; and
   a touchless switch operatively connected to said lamp and constructed to detect an object placed in a command location relative to said touchless switch and to respond thereto by operating said lamp, wherein said touchless switch is an active reflectance-sensitive switch comprising:
      means for emitting light, wherein said means for emitting light is constructed to focus said emitted light to said command location;
      detection means for detecting light reflected from said object, wherein said detection means is constructed and positioned to receive a substantial portion of reflected light which is reflected from said object in said command location;
      relay means responsively connected to said detection means and operatively connected to said lamp; and
      discrimination means for discriminating a true signal produced by said object at the command location from stray light and fluctuations in stray light intensity impinging on the detection means from the surrounding environment; wherein said discrimination means comprises optical filtering means covering said detection means for limiting the wavelength range of light impinging on said detection means.

7. An operatory light fixture for use in a sterile environment, having:
   at least one lamp disposed in a housing; and
   a touchless switch operatively connected to said lamp and constructed to detect an object placed in a command location relative to said touchless switch and to respond thereto by operating said lamp; wherein said touchless switch is an active reflectance-sensitive switch comprising:
      means for emitting light, wherein said means for emitting light is constructed to focus said emitted light to said command region;
      detection means for detecting light reflected from said object, wherein said detection means is constructed and positioned to receive a substantial portion of reflected light which is reflected from said object in said command location;
      relay means responsively connected to said detection means and operatively connected to said lamp; and
      discrimination means for discriminating a true signal produced by said object at the command location from stray light and fluctuations in stray light intensity impinging on the detection means from the surrounding environment; wherein said discrimination means comprises electrical filtering means disposed between an output of said detection means and said switch, for blocking detected signals having a frequency below a selected frequency limit.

8. The operatory light of claim 7, wherein said discrimination means further comprises optical filtering means covering said detection means for limiting the wavelength range of light received by said detection means.

9. The operatory light of claim 3, which is a dental operatory light.

10. A dental operatory light fixture, comprising a lamp within a housing, a touchless switch located on said housing and communicatively connected to said lamp for toggling the lamp between a lit and an unlit state and means for discriminating a true signal produced by placement of a user's hand at a command location from stray light, constructed and arranged such that said switch will toggle in response to only true signals.

11. The light fixture of claim 10, wherein said touchless switch is constructed to include detection means to detect a user's hand when positioned in a command location relative to said touchless switch and to respond thereto by operating said lamp and further including means for discriminating a true signal produced by placement of said hand at a command location from stray light impinging on said detection means.

12. A dental operatory light fixture, comprising a lamp within a housing, and a touchless switch located on said housing and communicatively connected to said lamp for toggling the lamp between a lit and an unlit state, said touchless switch being an active reflectance-sensitive switch, comprising means for emitting light, means for detecting light reflected from a user's hand, and relay means responsively connected to said detection means and operatively connected to said lamp, said touchless switch being constructed to detect said hand when said hand is positioned in a command location relative to said touchless switch and to respond thereto by operating said lamp.

13. A dental operatory light fixture, comprising at least one lamp within a housing, and a touchless switch located on said housing and communicatively connected to said lamp for toggling the lamp between a lit and an unlit state, said touchless switch being constructed to detect a user's hand when positioned in a command location relative to said touchless switch and to respond thereto by operating said lamp, wherein said touchless switch is an active reflectance-sensitive switch comprising:
   light emitting means for emitting light;
   detection means for detecting light reflected from said user's hand;
   relay means responsively connected to said detection means and operatively connected to said lamp; and
   a block having first and second channels formed therein, wherein said light emitting means is disposed within said first channel and said detection means is disposed within said second channel.

14. The light fixture of claim 13, wherein said first and second channels each have corresponding longitudinal axes, and said first and second channels are angled towards each other such that said longitudinal axes intersect in said command region.

15. The light fixture of claim 14, wherein said first and second channels have respective first and second interior diameters, said second interior diameter being between about half and about ¾ of said first interior diameter.

16. The light fixture of claim 15, further including optical filtering means covering said detection means for limiting the wavelength range of light received by said detection means.

17. The light fixture of claim 16, wherein said light-emitting means emits infrared light.

18. A dental operatory light fixture, comprising a lamp within a housing, and a touchless switch located on said housing and communicatively connected to said lamp for toggling the lamp between a lit and an unlit state, said touchless switch being constructed to detect a user's hand when positioned in a command location relative to said touchless switch and to respond thereto by operating said lamp, further including means for discriminating a true signal produced by placement of said user's hand at the command location from stray light impinging on the detection means.

19. A dental operatory light fixture, comprising:

at least one lamp within a housing;

a touchless switch located on said housing and communicatively connected to said lamp for toggling the lamp between a lit and an unlit state, wherein said touchless switch includes detection means constructed to detect a user's hand when positioned in a command location relative to said touchless switch and to respond thereto by operating said lamp; and discrimination means for discriminating a true signal produced by placement of said user's hand at the command location from stray light impinging on the detection means, wherein said discrimination means comprises optical filtering means covering said detection means for limiting the wavelength range of light received by said detection means.

20. A dental operatory light fixture, comprising:

at least one lamp within a housing;

a touchless switch located on said housing and communicatively connected to said lamp for toggling the lamp between a lit and an unlit state, wherein said touchless switch includes detection means constructed to detect a user's hand when positioned in a command location relative to said touchless switch and to respond thereto by operating said lamp; and discrimination means for discriminating a true signal produced by placement of said user's hand at the command location, from stray light impinging on the detection means, wherein said discrimination means comprises electrical filtering means disposed between an output of said detection means and said switch, for blocking detection means signals having a frequency below a selected frequency limit.

* * * * *